(12) United States Patent  (10) Patent No.: US 8,817,447 B2
Butzmann  (45) Date of Patent: Aug. 26, 2014

(54) DEACTIVATION DEVICE FOR DISCONNECTING AN ELECTRICAL ENERGY SOURCE FROM A LOAD, AND CIRCUIT SYSTEM HAVING A DEACTIVATION DEVICE

(75) Inventor: Stefan Butzmann, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 13/499,417

(22) PCT Filed: Aug. 18, 2010

(86) PCT No.: PCT/EP2010/062012
§ 371 (c)(1),
(2), (4) Date: Jun. 11, 2012

(87) PCT Pub. No.: WO2011/038987
PCT Pub. Date: Apr. 7, 2011

(65) Prior Publication Data
US 2012/0243135 A1   Sep. 27, 2012

(30) Foreign Application Priority Data
Oct. 1, 2009  (DE) .......................... 10 2009 045 244

(51) Int. Cl.
*H01H 37/76*  (2006.01)
*H01H 47/26*  (2006.01)
*H01H 1/00*  (2006.01)
*H01H 71/20*  (2006.01)

(52) U.S. Cl.
USPC ........... 361/211; 361/125; 337/157; 337/401; 337/406

(58) Field of Classification Search
USPC ................... 361/211, 125; 337/157, 401, 406
See application file for complete search history.

(56) References Cited

U.S. PATENT DOCUMENTS

| 3,544,843 | A | * | 12/1970 | Orville et al. ...................... 361/4 |
| 3,851,219 | A | * | 11/1974 | Kozorezov et al. ........... 361/103 |
| 4,380,725 | A | * | 4/1983 | Sherman ....................... 320/150 |
| 4,852,494 | A |   | 8/1989 | Williams |

(Continued)

FOREIGN PATENT DOCUMENTS

| CN | 2102576 | 4/1992 |
| CN | 2181113 | 10/1994 |

(Continued)

OTHER PUBLICATIONS

International Search Report, PCT International Application No. PCT/EP2010/062012, dated Feb. 3, 2012.

*Primary Examiner* — Scott Bauer
(74) *Attorney, Agent, or Firm* — Kenyon & Kenyon LLP

(57) ABSTRACT

A deactivation device for disconnecting an electrical energy source from a load includes at least two one-time switches. The one-time switches become inoperative upon switching in response to the presence of a load exceeding a critical value, thereby disconnecting an electrical connection. The one time switches are connected in parallel, and the deactivation device is configured in such a way that, except for a one-time switch, which is provided for disconnecting the energy source from the load and for connecting the energy source to the load, the at least one other one-time switch remains open. In the case of an inoperativeness of the one one-time switch, the at least one other one-time switch is used for disconnecting the energy source from the load and for connecting the energy source to the load.

7 Claims, 1 Drawing Sheet

(56) References Cited

U.S. PATENT DOCUMENTS

| | | | | |
|---|---|---|---|---|
| 5,757,150 | A * | 5/1998 | Kinoshita et al. | 318/139 |
| 6,411,190 | B1 * | 6/2002 | Yamaguchi et al. | 337/401 |
| 6,456,186 | B1 * | 9/2002 | Oglesbee | 337/161 |
| 6,710,995 | B2 * | 3/2004 | Knoedgen | 361/104 |
| 7,075,767 | B2 * | 7/2006 | Gemme et al. | 361/125 |
| 7,123,124 | B2 * | 10/2006 | Caruso et al. | 337/157 |
| 7,333,315 | B2 * | 2/2008 | Kawazu et al. | 361/104 |

FOREIGN PATENT DOCUMENTS

| | | |
|---|---|---|
| EP | 1313193 | 5/2003 |
| JP | 54-177537 | 6/1953 |
| JP | H 03-116625 | 5/1991 |
| JP | 7-274378 | 10/1995 |
| JP | 2001-25150 | 1/2001 |
| JP | 2008-147029 | 6/2008 |

* cited by examiner

DEACTIVATION DEVICE FOR DISCONNECTING AN ELECTRICAL ENERGY SOURCE FROM A LOAD, AND CIRCUIT SYSTEM HAVING A DEACTIVATION DEVICE

FIELD OF THE INVENTION

The present invention relates to a deactivation device for disconnecting an electrical energy source from a load. The present invention also relates to a circuit system having an electrical energy source, a load and a deactivation device.

BACKGROUND INFORMATION

Battery systems are being increasingly used today both for stationary applications, such as wind turbine generator systems, as well as for vehicles, such as hybrid and electric-powered vehicles. To enable the battery system to be disconnected from a load, for example from a vehicle electrical system, it is generally known to use circuit breakers, such as contactors, for example. FIG. 1 schematically shows such a conventional deactivation device. The deactivation device includes a battery 2 that is electrically connected to a load 3. At each terminal of battery 2, a circuit breaker 10 is connected in series between battery 2 and load 3. These types of circuit breakers permit the repeated disconnection of such a system, in particular under load as well. An inherent drawback, however, is that the circuit breakers are very costly.

SUMMARY

An example deactivation device according to the present invention for disconnecting an electrical energy source from a load includes at least two one-time switches, the one-time switches becoming inoperative upon switching in response to the presence of a load exceeding a critical value, thereby disconnecting an electrical connection, the one time switches being connected in parallel, and the deactivation device being configured in such a way that, except for a one-time switch provided for disconnecting the energy source from the load and for connecting the energy source to the load, the at least one other one-time switch remains open, and, in the case of an inoperativeness of the one one-time switch, the at least one other one-time switch is used for disconnecting the energy source from the load and for connecting the energy source to the load.

The example deactivation device according to the present invention makes it possible for an electrical energy source to be disconnected from a load even if the load has exceeded a critical value, for example in the case of full load. The number of one-time switches determines the number of switch-off operations permitted under such a condition. If only a small number of such switch-off operations is required, cost advantages are derived by using the deactivation device according to the present invention since low-cost, one-time switches may be used instead of costly circuit breakers.

A further object of the present invention is a circuit system having an electrical energy source, a load, and a deactivation device according to the present invention, the deactivation device being connected between the energy source and the load in order to disconnect the load from the energy source and to connect the load to the energy source.

The deactivation device is preferably connected between a terminal of the energy source and the load, and a further switch is connected between the other terminal of the energy source and the load. This makes it possible for the load to be completely electrically disconnected from the energy source.

The circuit system is preferably configured to allow a one-time switch to be initially opened to disconnect the load from the energy source, and for the further switch to be subsequently opened. This ensures that the further switch is able to be opened at zero current and not be thereby loaded.

The further switch may be a one-time switch of a further deactivation system connected between the energy source and the load. The number of switch-off operations permitted under load may be thereby additionally increased.

Other advantageous specific embodiments of the present invention are possible.

The present invention is described in greater detail below with reference to a specific embodiment that is illustrated by a figure.

DETAILED DESCRIPTION OF EXAMPLE EMBODIMENTS

Figure 1:
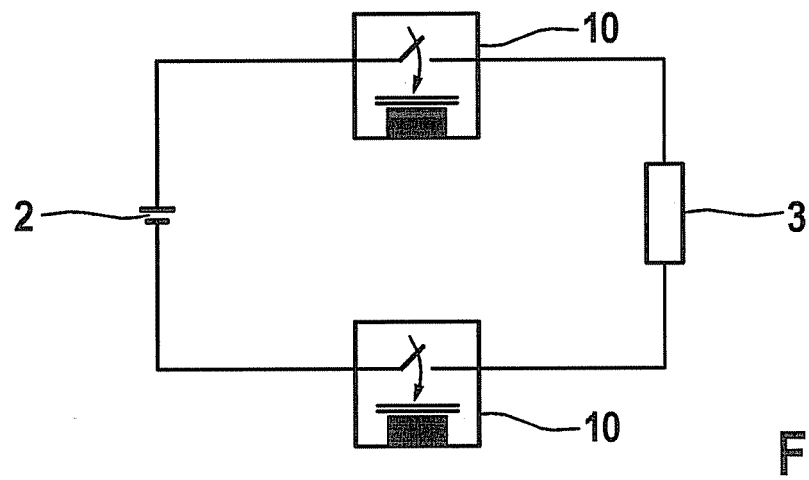
FIG. 1 shows a conventional circuit system in accordance with the related art.
Figure 2:
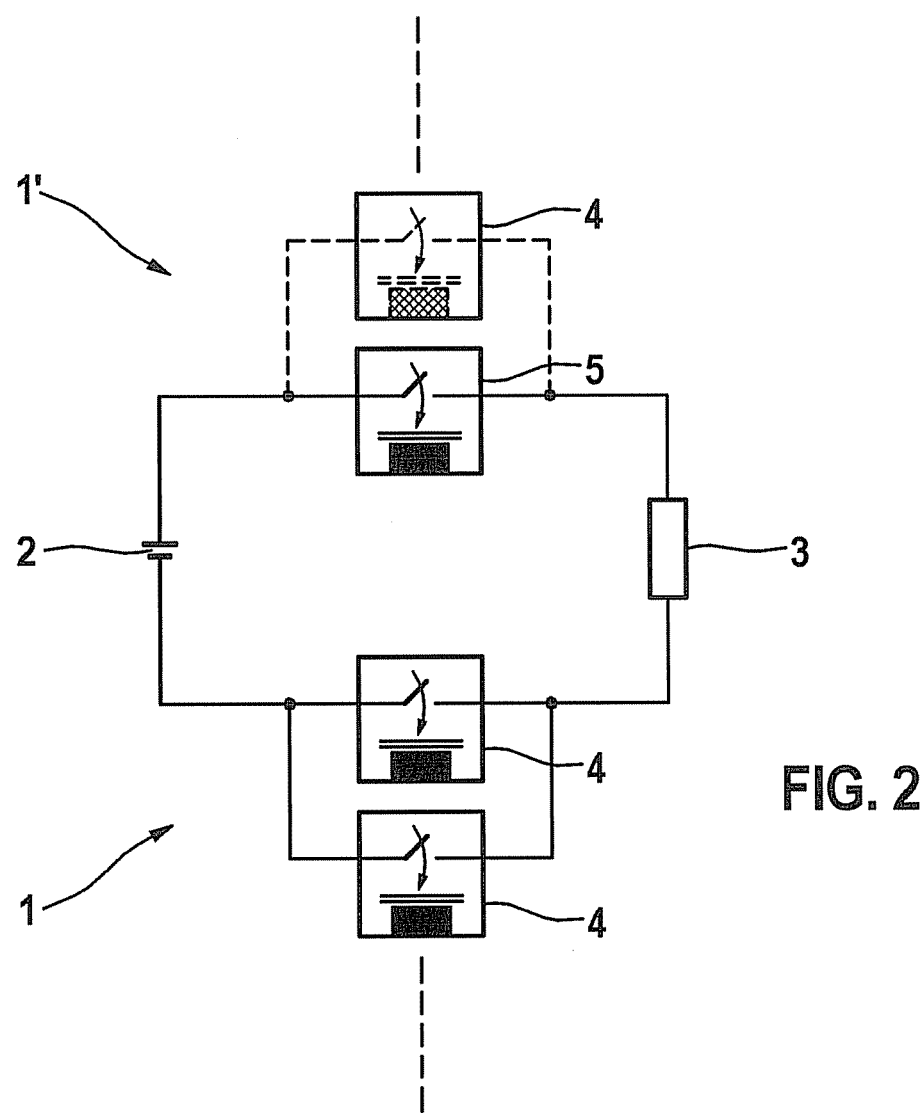
FIG. 2 shows a specific embodiment of a circuit system according to the present invention that encompasses a specific embodiment of a deactivation device according to the present invention.

FIG. 2 schematically shows a specific embodiment of a circuit system according to the present invention. The circuit system includes an electrical energy source 2, preferably a battery, a load 3, and a specific embodiment of a deactivation device 1 according to the present invention.

Deactivation device 1 is connected between a terminal of the energy source and load 3. Deactivation device 1 includes two one-time switches 4 which are connected in parallel. One-time switches 4 are designed to become inoperative upon switching in response to the presence of a load exceeding a critical value, thereby disconnecting the electrical connection between energy source 2 and load 3. As one-time switch 4, a combustible relay may be used, for example, that is destroyed in response to the presence of a high current and the resultant spark. Alternatively, a conventional relay could also be used, for example, in series with an explosive protection device that is ignitable when the critical value for the load is exceeded.

Deactivation device 1 is configured in such a way that, except for a one-time switch 4, which is provided for disconnecting the energy source from the load and for connecting the energy source to the load, the at least one other one-time switch remains open; and, in the case of an inoperativeness of one one-time switch 4, the at least one other one-time switch 4 is used for disconnecting energy source 2 from load 3 and for connecting the energy source 2 to the load 3.

In addition, the circuit system includes one further switch 5 that is connected between the other pole of energy source 2 and load 3. Thus, by actuating a one-time switch 4 of deactivation device 1 and of further switch 5, load 3 may be completely electrically disconnected from energy source 2.

In normal operation of the circuit system, only further switch 5 and a one-time switch 4 of deactivation device 1 are always open or closed. In the case of error-free disconnection of load 3 from energy source 2, i.e., in the case of disconnection at zero current or possibly even under a small partial load, both switch 5, as well as one-time switch 4 may be opened, without any damage to the switches occurring. In the case of a presence of a load exceeding a critical value, for example an excessive current caused by a fault, or, for example, even in the case of a full load, a one-time switch 4, which, as a general principle, is opened prior to further switch 5, is destroyed upon disconnection of load 3 from energy source 2. The current flow is thereby interrupted. Further switch 5 is subsequently opened at zero current. If load 3 is to be reconnected to energy source 2, then further switch 5 and the next, so far unused one-time switch 4 are closed. In this context, the closing sequence is interchangeable.

In one alternative specific embodiment of the circuit system, further switch 5 is a one-time switch and part of a further deactivation device 1'. Besides switch 5, further deactivation device 1' includes further one-time switches 4 that are represented by dashed lines in FIG. 2. Further deactivation device 1' is comparable in design to first deactivation device 1.

FIG. 2 shows two one-time switches 4, 4 and 4, 5 for deactivation device 1 and further deactivation device 1', respectively. However, any given number of one-time switches 4 may generally be selected.

What is claimed is:

1. A deactivation device for disconnecting an electrical energy source from a load, comprising:
    at least two one-time switches, the one-time switches becoming inoperative upon switching in response to presence of a load exceeding a critical value thereby disconnecting an electrical connection, the one-time switches being connected in parallel, and the deactivation device being configured in such a way that one of the one-time switches is for disconnecting the energy source from the load and for connecting the energy source to the load, and the at least one other one-time switch remains open, except in a case of an inoperativeness of the one of the one-time switches, in which case the at least one other one-time switch is used for disconnecting the energy source from the load and for connecting the energy source to the load.

2. The deactivation device as recited in claim 1, wherein the one-time switches include at least one of a combustible relay and a combustible relay device having a series connected relay and an explosive protection device that is ignitable when critical value load is exceeded.

3. A circuit system, comprising:
    an electrical energy source;
    a load; and
    a deactivation device connected between the energy source and the load to disconnect the load from the energy source and to connect the load to the energy source, the deactivation device including at least two one-time switches, the one-time switches becoming inoperative upon switching in response to presence of a load exceeding a critical value, thereby disconnecting an electrical connection, the one-time switches being connected in parallel, and the deactivation device being configured in such a way that one of the one-time switches is provided for disconnecting the energy source from the load and for connecting the energy source to the load, and the at least one other one-time switch remains open, except in a case of an inoperativeness of the one of the one-time switches, in which case the at least one other one-time switch is used for disconnecting the energy source from the load and for connecting the energy source to the load.

4. The circuit system as recited in claim 3, wherein the energy source is a battery.

5. A circuit system, comprising:
    an electrical energy source;
    a load; and
    a deactivation device connected between the energy source and the load to disconnect the load from the energy source and to connect the load to the energy source, the deactivation device including at least two one-time switches, the one-time switches becoming inoperative upon switching in response to presence of a load exceeding a critical value, thereby disconnecting an electrical connection, the one-time switches being connected in parallel, and the deactivation device being configured in such a way that one of the one-time switches is provided for disconnecting the energy source from the load and for connecting the energy source to the load, and the at least one other one-time switch remains open, except in a case of an inoperativeness of the one of the one-time switches, in which case the at least one other one-time switch is used for disconnecting the energy source from the load and for connecting the energy source to the load,
    wherein the deactivation device is connected between a terminal of the energy source and the load, and a further switch is connected between another terminal of the energy source and the load.

6. The circuit system as recited in claim 5, wherein at least one of the one-time switches is initially opened to disconnect the load from the energy source, and the further switch is subsequently opened.

7. The circuit system as recited in claim 5, the further switch is a one-time switch of a further deactivation system that is connected between the energy source and the load.

* * * * *